United States Patent [19]

Glesser

[11] Patent Number: 5,580,019
[45] Date of Patent: Dec. 3, 1996

[54] RETROFITABLE GAS CAP HOLDERS

[76] Inventor: Louis S. Glesser, Box 800, Golden, Colo. 80402-0800

[21] Appl. No.: 443,333

[22] Filed: May 17, 1995

[51] Int. Cl.⁶ ........................................................ B60R 11/00
[52] U.S. Cl. ............................ 248/309.1; 248/205.3; 296/97.22; 224/400; 224/539
[58] Field of Search ............................. 248/205.3, 300, 248/309.1, 316.7, 225.1; 296/97.22, 37.13; 224/543, 539, 545, 567, 400

[56] References Cited

U.S. PATENT DOCUMENTS

| | | | |
|---|---|---|---|
| 1,622,167 | 3/1927 | Smith | 224/543 |
| 3,878,589 | 4/1975 | Schaefer | 248/225.11 X |
| 4,250,601 | 2/1981 | Ward | 248/225.11 X |
| 4,746,089 | 5/1988 | Clapper | 296/97.22 X |
| 5,026,016 | 6/1991 | Lisowski | 248/225.11 X |
| 5,118,019 | 6/1992 | Harrison | 224/42.46 R |

*Primary Examiner*—Robert Canfield

[57] ABSTRACT

The retrofitable fuel cap holder of this invention is and can be fixed on inner surface hinged vehicular gas cap lids. The cap includes a base, a support and a compression mechanism. Fuel is compressible in a direction substantially normal to an inner surface of the lid. The base has a fuel cap retainer, such as a notch, where the gas cap is placed during refueling. The support has adhesive for attachment to the inner surface of the lid and one of the base and support are conformable to the inner surface of the lid.

20 Claims, 4 Drawing Sheets

RETROFITABLE GAS CAP HOLDERS

BACKGROUND OF THE INVENTION

When a fuel line cap is removed while refueling a vehicle a problem exists about where to put the cap prior to placing it back on the fuel line.

There have been a variety of approaches to design of devices for holding the fuel line cap while refueling. Some of them use a flexible line to connect the cap to the vehicle. Other cap holders are made from a metal base, welded to a inner surface of the hinged fuel cap lid, which contains a "U" shaped notch where the cap is put while refueling. Also, notched cap holders are molded to the inner surface of the lid. Another cap nolder is made from U-shaped plastic with projections having bases interlocked with corresponding grooves in the inner surface of the lid.

However, these known cap holders are effectively a part of the lid and are made for specific types of lids. They can not be used with any other vehicle models, in other words they are not universal. The present invention provides a retrofitable fuel cap holder which can be attached to the inner surface of any type of fuel cap lid. Furthermore, the approach taken can provide expensive models for expensive vehicles and inexpensive models for inexpensive vehicles if desired. The present invention solves the problem of a) variable lid size, configuration and contour, i.e., the hinge attachement creates an uneven inner lid surface, and b) the space between the lid and fuel line is small.

SUMMARY OF THE INVENTION

The retrofitable fuel cap holder includes a "notched" base and a support. One or both will be at least partially compressible in a direction substantially normal to the inner surface of the hinged lid to which it is to be attached. The compression mechanism may be a property of either or both of the base or support, a part of either or both or a separate element. The notch can be made up of a single "cut" into a single base element or number of parts which form the equivalent of a notch.

The cap holder of this invention is preferably made not for a specific type of vehicle but for any model, i.e., provides a basis for a universal design.

DETAILED DESCRIPTION OF THE FIGURES

Figure 1:
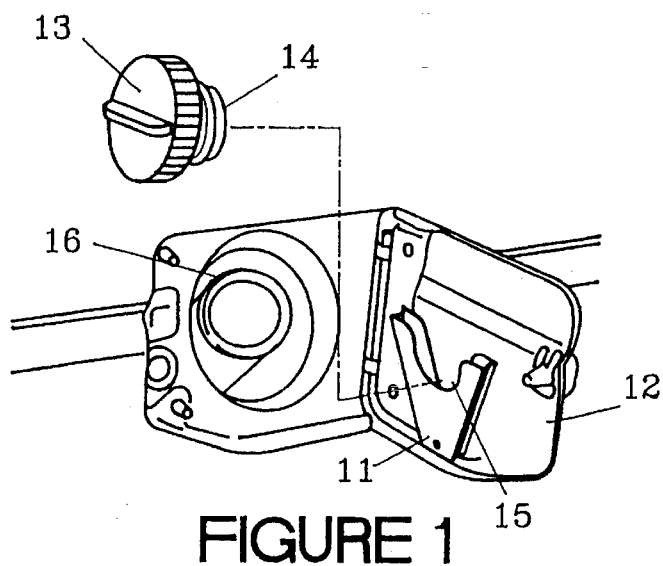
FIG. 1 depicts a front perspective view of a unitary fuel line cap and a retainer in place on the rear of the lid.

FIG. 1 shows the cap holder 11 of FIG. 1 attached to the inner surface of the fuel cap lid 12. The threads 14 of the fuel line cap 13 rest on the edge of the notch 15 of the cap holder while refueling. On completion of refueling, the cap 13 is screwed into the mouth of fuel line 16.

Figure 2:
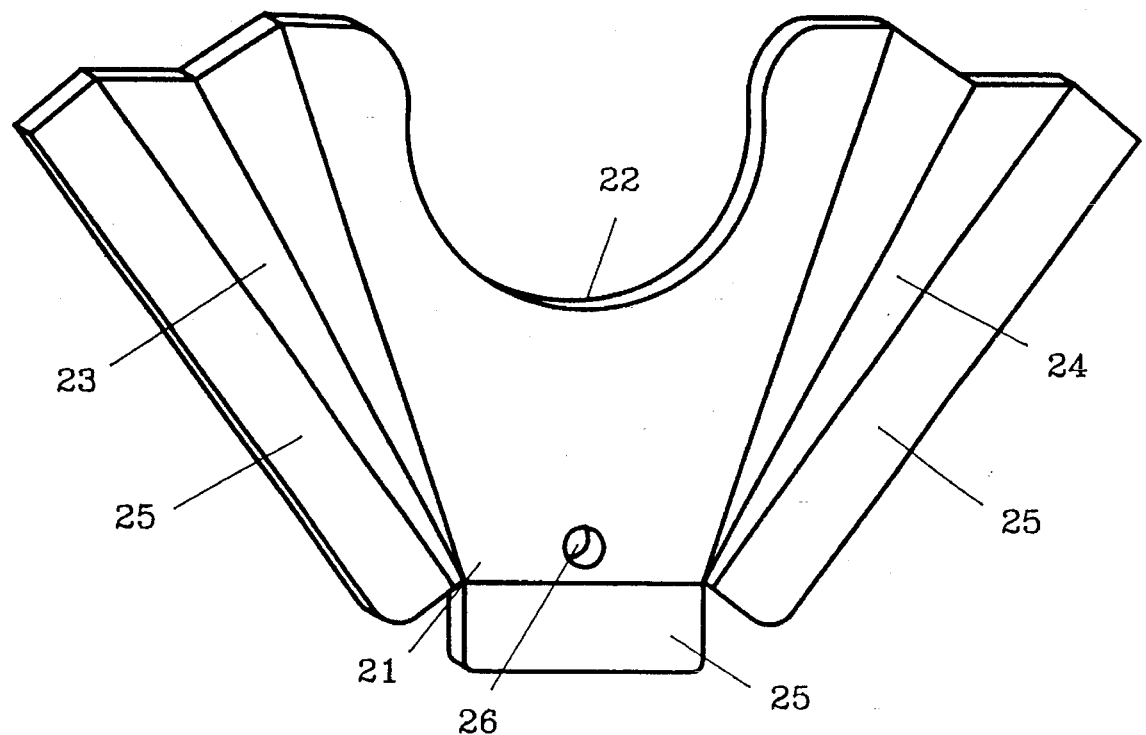
FIG. 2 shows a blank of a preferred embodiment with slight bends at parts of the bend lines.

The plastic impregnated, paper product cap holder of FIG. 2 consists of a base 21 with a U-shaped notch 22 and two support pleats 23 and 24 and bottom support elements 25. Support elements 25 have an adhesive strip (not shown) on the opposite side. Support elements 25 are adhered to the lid (see FIG. 1) prior to use. The base 21 has a hole 26 to allow any liquids to drain. A peelable film (not shown) protects the adhesive surface from dirt etc. The accordion pleats 23 and 24 provide compressibility in the direction normal to the inner surface of the fuel line lid.

Figure 3:
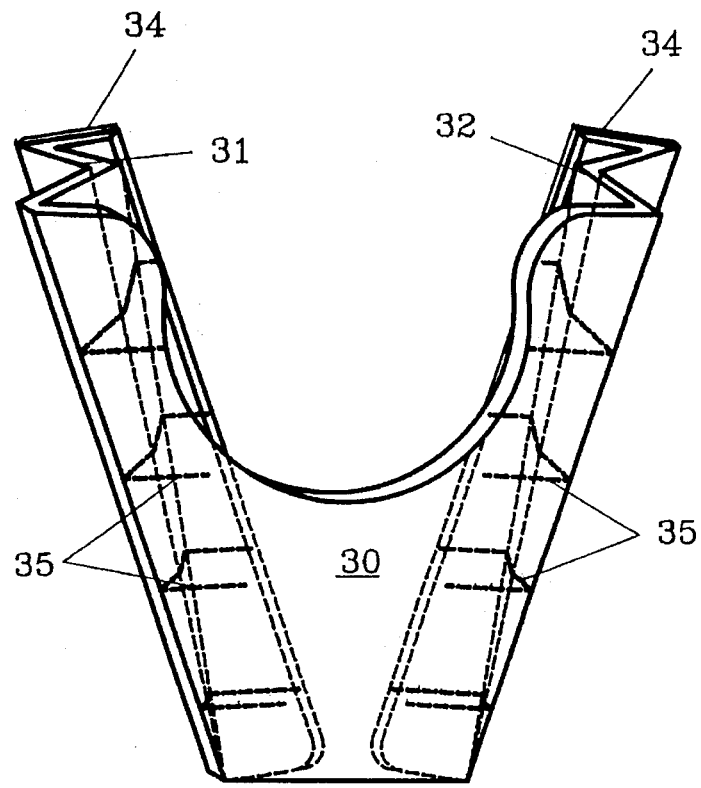
FIG. 3 demonstrates a front elevation of the embodiment shown in FIG. 2 when folded for adhesion to the inner surface of a lid.

FIG. 3 demonstrates a front view of a cap holder 30 similar to that of FIG. 2. Folded support elements 31 and 32 are fully accordion pleated and the bottom surfaces have an attached double adhesive strip 34. The unit includes fine spring wires 35 within these pleated devices. There is no bottom support 25 as shown in FIG. 1.

Figure 4:
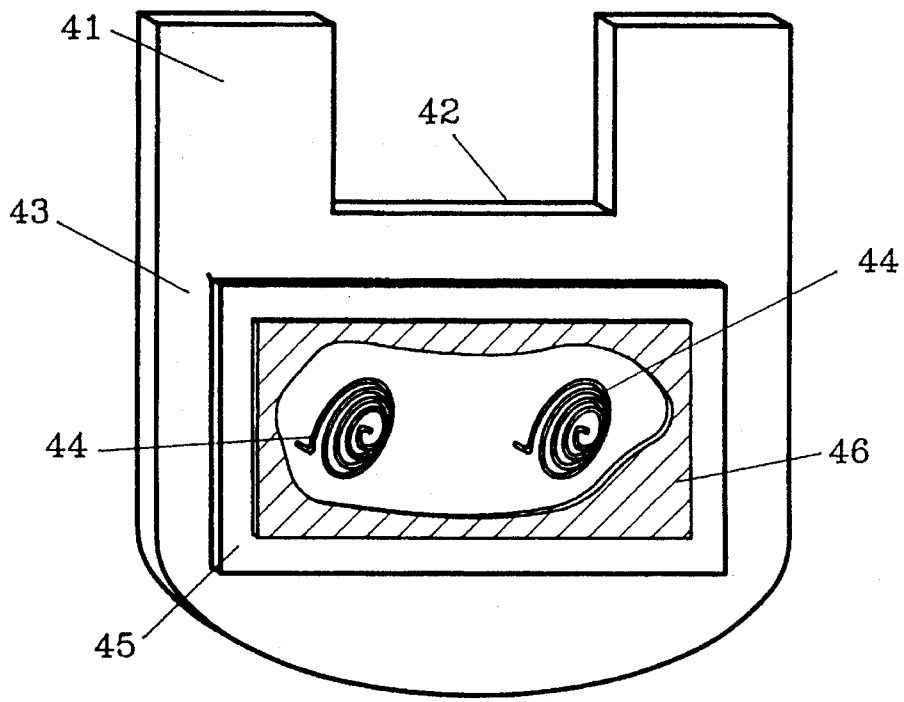
FIG. 4 depicts a rear perspective view of a second embodiment of the invention using a foam layer as the conformable support.

FIG. 4 demonstrates a rear perspective view of a second embodiment of the cap holder of the invention, where the base 41 has a squared notch 42. Support 43 has a coiled spring compression element 44, a thick elastometric foam layer 45. Layer 45 has an adhesive layer on its outer surface 46 for attachment to the inner surface of a fuel cap lid.

Figure 5:
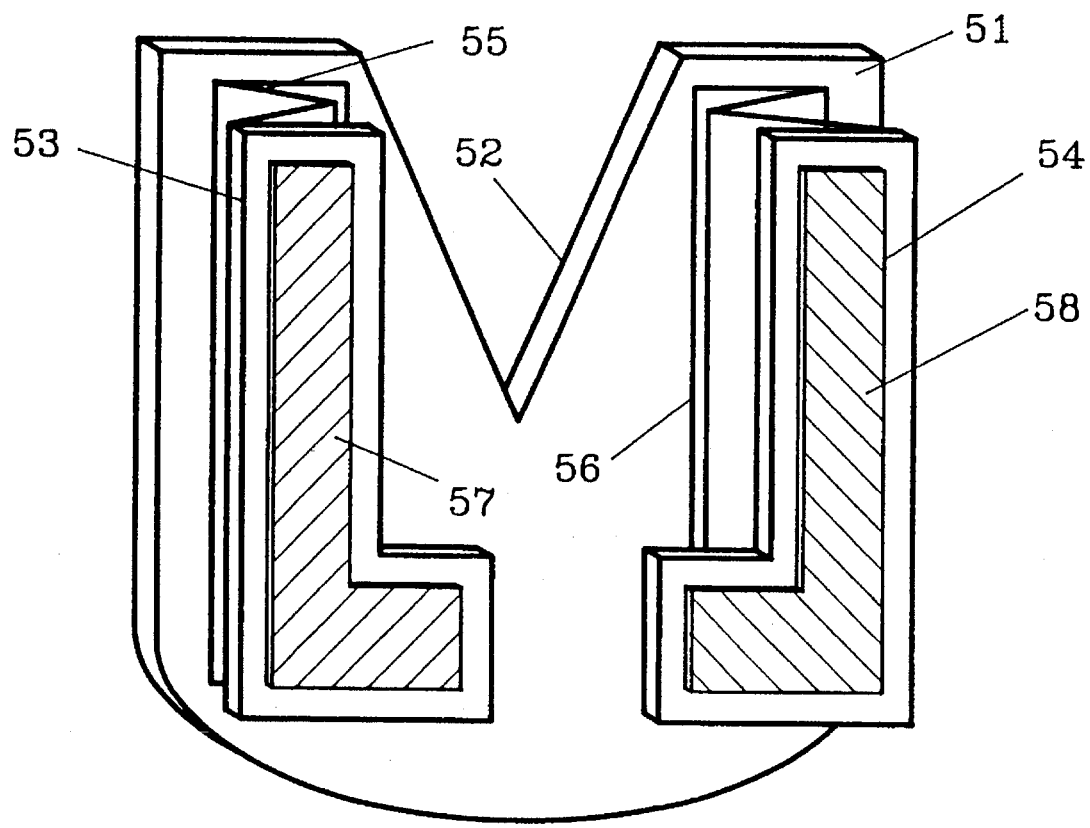
FIG. 5 shows a rear perspective view of a third embodiment of the cap retainer using flat accordian, i.e., pleated springs.

FIG. 5 shows a third embodiment of a cap holder. The base 51 includes the V-shaped notch 52 and is connected to two supports 53 and 54 through accordian springs 55 and 56. The supports 53 and 54 have adhesive layers 57 and 58 for attachment to the inner surface of the fuel cap lid.

Figure 6:
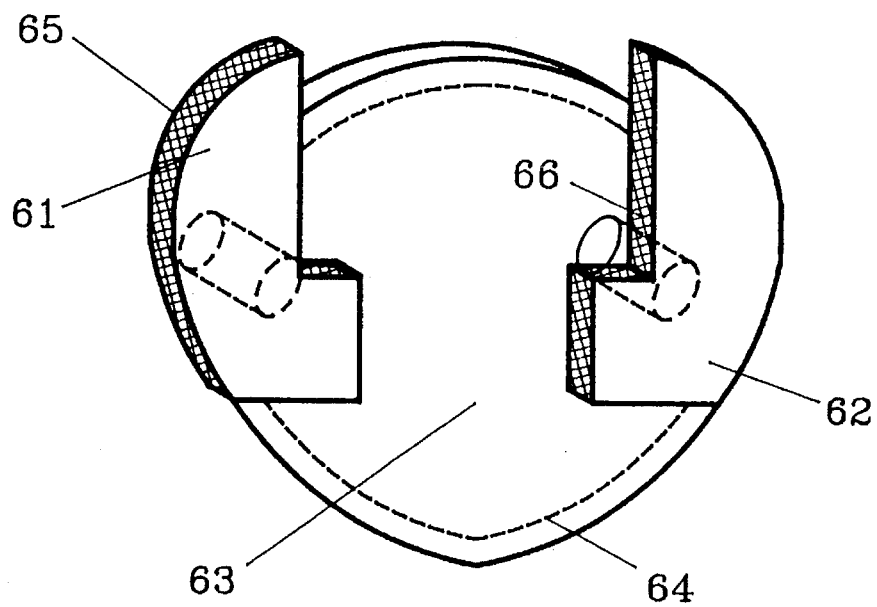
FIG. 6 demonstrates a perspective view of a forth "V" shaped embodiment of the cap holder with a small support and a two element base.

FIG. 6 shows a fourth embodiment of the cap holder. The base is made of two parts 61 and 62 positioned so that a fuel cap is retained between them. The support 63 has, on its bottom surface, adhesive 64 for attachment to the inner surface of the fuel cap lid. Rubber posts 65 and 66 provide the needed compressability.

Figure 7:
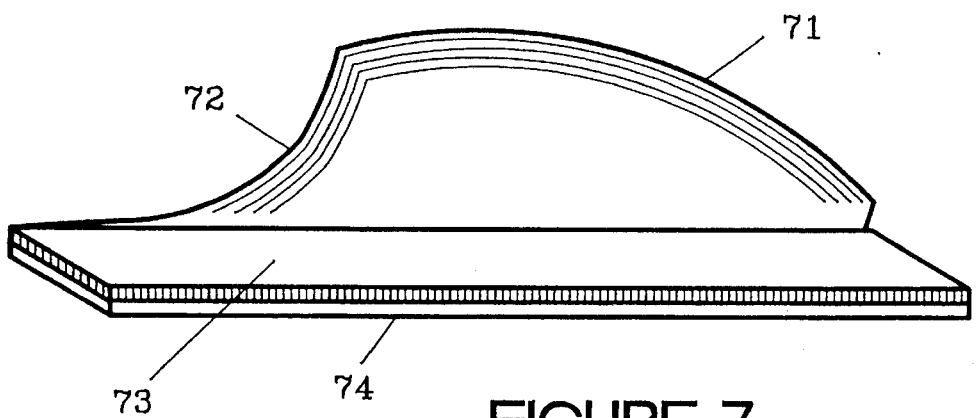
FIGS. 7 and 8 depict a side and perspective view of a fifth embodiment of the cap holder where the base is made of an elastomer.
Figure 8:
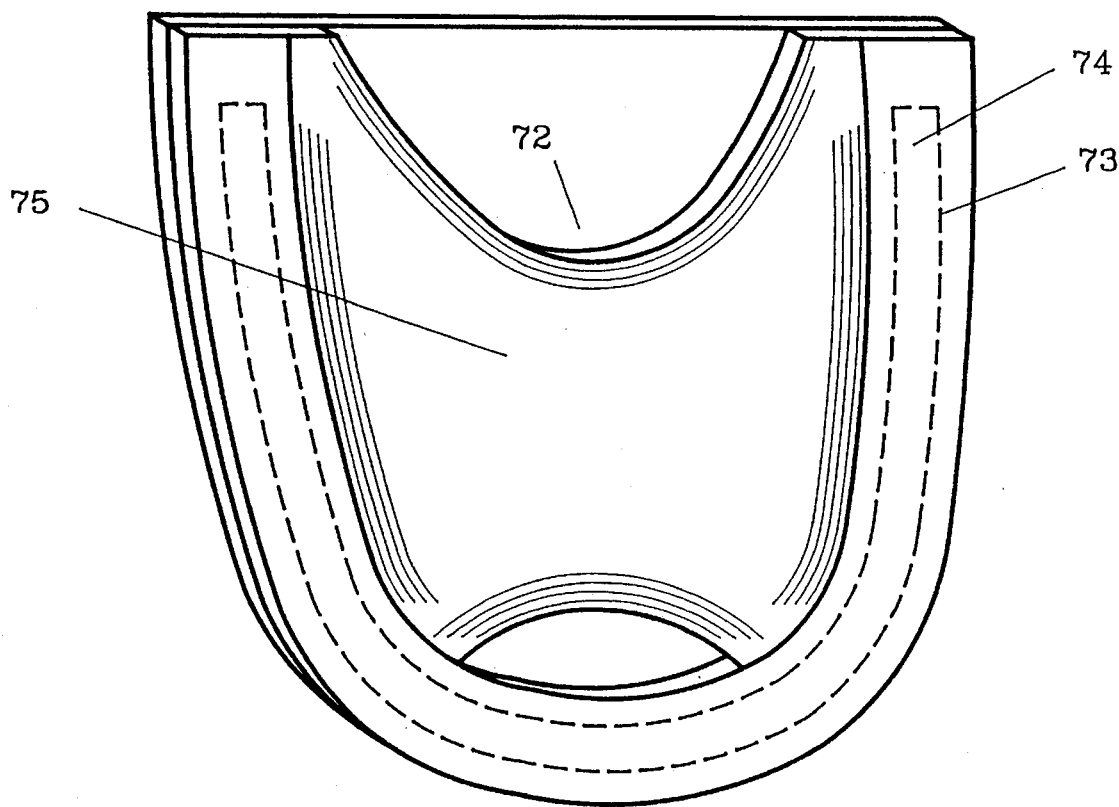

FIGS. 7 and 8 show a fifth embodiment of the cap holder. The base 71 has a curved shape and is preferably made from an elastomeric material, e.g., a sheath or open pore foam. The base 71 includes the notch 72. Support 73 has adhesive 74 on its under surface for attaching the support to the inner surface of the fuel cap lid.

GENERAL DESCRIPTION OF THE INVENTION

The base, the support and compression mechanism are made from non-corrodible materials, such as plastic, coated paper products, metals or elastomeric materials such as a natural or synthetic rubber e.g., a silicone rubber. Paper products can be reinforced by impregnation with plastic. Both plastics and paper products can have imbedded wire springs. The desired compressibility can result of the compressibility of the base, the support or the assembly as a whole.

Due to compressibility of the assembly the cap holder can be fitted into any available space between the vehicular lid and the gas line cap when closed.

The base can be notched or grooved or hollowed out for retention of the appropriately placed gas cap while refueling. The size and shape of the notch is preferably predetermined by a size of the fuel line cap threads. However, the cap can also be secured by its handle. The base and supports can both be made from a plurality of parts. In such an event, the fuel line cap can be placed between them. The size of the support is predetermined by a size of the fuel line lids.

All or a part of the rear surface of the support have an adhesive for attachment to the inner surface of the fuel cap lid. The adhesive can be a double sided tape, a microencapsulated glue layer or an adhesive which attaches to the support and is coated with a peelable plastic layer. The support or part of the support is conformable with this inner surface lid. These features allow the retrofitable cap holder to be attached to the inner surface of any type of a gas line hinged lid. The support can have essentially any shape which allows the cap holder to be securely attached to the inner surface of fuel line lid.

This invention prevents loss of the fuel cap after refueling because the cap must be placed back on the fuel line. The lid with cap holder can be closed only when the cap is removed from the notch.

While the figures depict several embodiments of the invention other shapes of the notch, the base, the supporting element and the springs can be utilized e.g. hexagonal, octagonal etc.

I claim:

1. A retrofitable holder for vehicular fuel line caps during refueling comprising the combination of:

base means including a match like cap retention means for retaining fuel line caps during refueling, at least one support means attached to said base means, said at least one support means including adhesive means, for adhering the support means to an inner surface of a hinged vehicular lid for the fuel line cap, at least a portion of one of said at least one support means and said adhesive means being substantially conformable to the said inner surface of the lid and at least one of the bame means and the support means including means for compression, said compression being in a direction substantially normal to the base means.

2. The holder of claim 1 wherein one of the base means and the support means includes said means for compression.

3. The holder of claim 1 or 2 wherein the means for compression is elastomeric.

4. The holder of claims 1 or 2 wherein the means for compression is at least one spring.

5. The holder of claims 1 or 2 wherein the means for compression is at least one plastic spring.

6. The holder of claims 1 or 2 wherein the means for compression is at least one metal spring.

7. The holder of claims 1 or 2 wherein the means for compression is a pleated paper product.

8. The holder of claims 1 or 2 wherein the base means includes means for compression.

9. The holder of claims 1 or 2 wherein the base means includes a plurality means for compression.

10. The holder of claims 1 or 2 wherein the adhesive means is microencapsulated glue.

11. The holder of claims 1 or 2 wherein the support means includes means for compression.

12. The holder of claims 1 or 2 wherein the support means includes a plurality of means for compression.

13. The holder of claims 1 or 2 wherein the cap retention means is a "U"-shaped notch.

14. The holder of claims 1 or 2 wherein the means for compression are positioned proximate to two sides of the support means.

15. The holder of claims 1 or 2 wherein at least one of the base means and the support means includes spaced apart means of compression.

16. The holder of claims 1 or 2 wherein the holder generally has a box configuration when viewed in elevation.

17. The holder of claims 1 or 2 wherein the holder generally has a "U"-shaped configuration when viewed in elevation.

18. The holder of claims 1 or 2 wherein the base means has a plurality of separate parts which form the cap retention means.

19. The holder of claims 1 or 2 wherein the support means has a plurality of separate parts for contact with the vehicular lid.

20. The holder of claims 1 or 2 wherein the cap retention means is formed by a plurality of base means.

* * * * *